Patented Sept. 25, 1928.

1,685,630

UNITED STATES PATENT OFFICE.

EUGENE T. DRAKE, OF OMAHA, NEBRASKA, ASSIGNOR TO THE CUDAHY PACKING COMPANY, OF CHICAGO, ILLINOIS, A CORPORATION OF MAINE.

PROCESS OF CURING MEATS.

No Drawing.   Application filed February 8, 1926. Serial No. 86,964.

The invention relates to a process for curing meats of all kinds by means of the product disclosed in my co-pending application Serial No. 86,963 of February 8, 1926, the objects being more rapid, efficient and economical curing of said meats, with absolutely predetermined control of the curing process.

Meat can be cured by the use of nitrite in any form. By the term "cure" herein is meant the biochemical change taking place in meat, whereby the muscle hæmoglobin unites with the nitrite to produce a red color. This change is believed to be a combination of nitric oxide with the muscle hæmoglobin, but this theory has not been definitely established. With the present method I not only add nitrite which accelerates the cure, but improve the flavor of the meat by the addition of species of denitrifying bacteria. This process can hence be carried out in two ways, that is, by sterilizing an original pickle, thus producing purely a nitrite cure, or by adding the pickle without sterilization, effecting both a rapid cure and improving the flavor of the meat.

The pickle is produced in the following manner as described in the above mentioned co-pending application for the production of nitrites.

In the co-pending application a first or preliminary culture is prepared of an aqueous solution, for example, of 2 to 8% of sodium nitrate, ½ to 20% of sugar and ½ to 17% of common salt. This solution should contain a protein material in some form including amino nitrogen from $\frac{5}{100}$ to 2%; it may be added in the form of a peptone or by using a sterilized second pickle containing meat juices. The hydrogen ion concentration of this medium is adjusted to between 5 and 10. This medium is then rendered sterile by heating at a suitably high temperature for about twenty minutes; such suitably high temperature would be a temperature not lower than 75° C. However, to cause boiling during the sterilization it is necessary to heat it to a temperature somewhat above 100° C. owing to the presence of the salt which raises the boiling point of the solution.

The suitably high temperatures disclosed above are thus common and well known in the art, for example, see Patent No. 1,259,377 to Doran.

A first or preliminary pickle or culture, consisting, for example, of an aqueous solution of sodium nitrate or its equivalent, any kind of sugar, and common salt, to which a protein material in some form including amino nitrogen is added, for example, in the form of peptone or a sterilized second pickle containing meat juices, is inoculated with pure cultures of one or more of a group of bacilli or spirilli which, among other properties have that of converting nitrates into nitrites. The ingredients are taken in such amounts and proportions as is customary in meat curing plants to produce a pickling bath of the desired strength; and these amounts and proportions may be widely varied. These organisms have not been hitherto isolated or classified but may be identified by the following characteristics:

They are non-putrefactive.
They are non-pathogenic.
They are nitrate-reducing.
They are non-proteolytic.
They are motil and non-motil.
They are salt-tolerant.
They are either bacilli or spirilli.

These particular bacilli or spirilli are derived from the pickling liquors resulting from the treatment of meat. They grow with large numbers of other bacteria in the ordinary pickles or cures. The source and method of derivation which may be used to derive these particular forms of bacteria are clearly disclosed in Patents Nos. 1,259,377 to Doran, 1,380,068 to Kurk, and 1,380,070 to Kurk, all of which relate to the art of curing meat.

This inoculated preliminary culture is allowed to grow for 24 to 36 hours at a temperature between 70 and 110° E., although good results have been obtained with temperatures as low as 34° F., oxygen being supplied, preferably by aeration.

About 1% of this culture, when completed, is used to produce a second culture or pickle, which is prepared in exactly the same manner and under the same conditions as the preliminary pickle or culture, but in amount 20 times as great; and on completion of this second pickle or culture, one per cent thereof is used to produce a third pickle or culture prepared exactly as the second, but in amount 20 times as great as said second pickle or culture, the hydrogen ion concentration being maintained in the second and third cultures as in the preliminary culture.

From 1 to 3% of this third pickle or culture is used to produce the final or working pickle, said quantity sufficing to produce enough for the ordinary pickling vat, in about six days. As in the preceding cultures, the hydrogen ion concentration is maintained constant and oxygen constantly added, preferably by aeration.

The culture of living bacteria (bacilli or spirilli) may be a pure culture of denitrifiers when used only for the production of nitrite, as set forth in my co-pending application hereinbefore mentioned, or, when the object is improvement of flavor, a mixed culture containing organisms capable of affecting the flavor of the meat, and the culture of denitrifying organisms above mentioned may be used.

By this use of this final pickle for curing meats not only is the period in which cure is effected so greatly reduced as to prove an obvious enormous economy, but the quantity of the residual nitrites in the meats is decreased to an amount far below that now existing.

Instead of using the final or working pickle in the form of its aqueous solution, wherein the meats are immersed or which is admixed with comminuted meats, such as sausage meat, it may be converted to solid form, as, for example, by removing the water by evaporation, for example, into that of a salt, and this latter applied superficially to the meats, with excellent curing results.

I claim:—

1. A process of curing meat which comprises immersing the meat in a pickle prepared by inoculating a series of cultures formed of an aqueous solution of a nitrate, sugar, salt and a protein material with one of a group of bacteria comprising non-putrefactive, non-pathogenic, nitrate-reducing, non-proteolytic, salt-tolerant bacilli or spirilli.

2. A process of curing meat which comprises immersing the meat in a pickle prepared by inoculating a series of cultures formed of an aqueous solution of an alkali metal nitrate, sugar, salt and a protein material with one of a group of bacteria comprising non-putrefactive, non-pathogenic, nitrate-producing, non-proteolytic, salt-tolerant, bacilli or spirilli.

3. A process for curing meat which comprises inoculating a preliminary culture formed of an aqueous solution of nitrate, sugar, salt and protein with one of a group of bacteria comprising selected species of bacilli or spirilli having characteristics set forth in claim 1, utilizing this preliminary culture to produce a second culture 20 times the amount thereof, utilizing this second culture to produce a third culture 20 times the amount of the second culture, utilizing this third culture to produce a final pickle, the hydrogen ion concentration being maintained constant in all cultures and oxygen being continuously added, and treating the meat to be cured with said final or working pickle.

4. The process of curing meat which comprises treating the meat with a preparation containing one of a group of non-putrefactive, non-pathogenic, nitrate-reducing, non-proteolytic, and salt-tolerant bacteria.

In testimony whereof I have hereunto set my hand.

EUGENE T. DRAKE.